Figure 1:
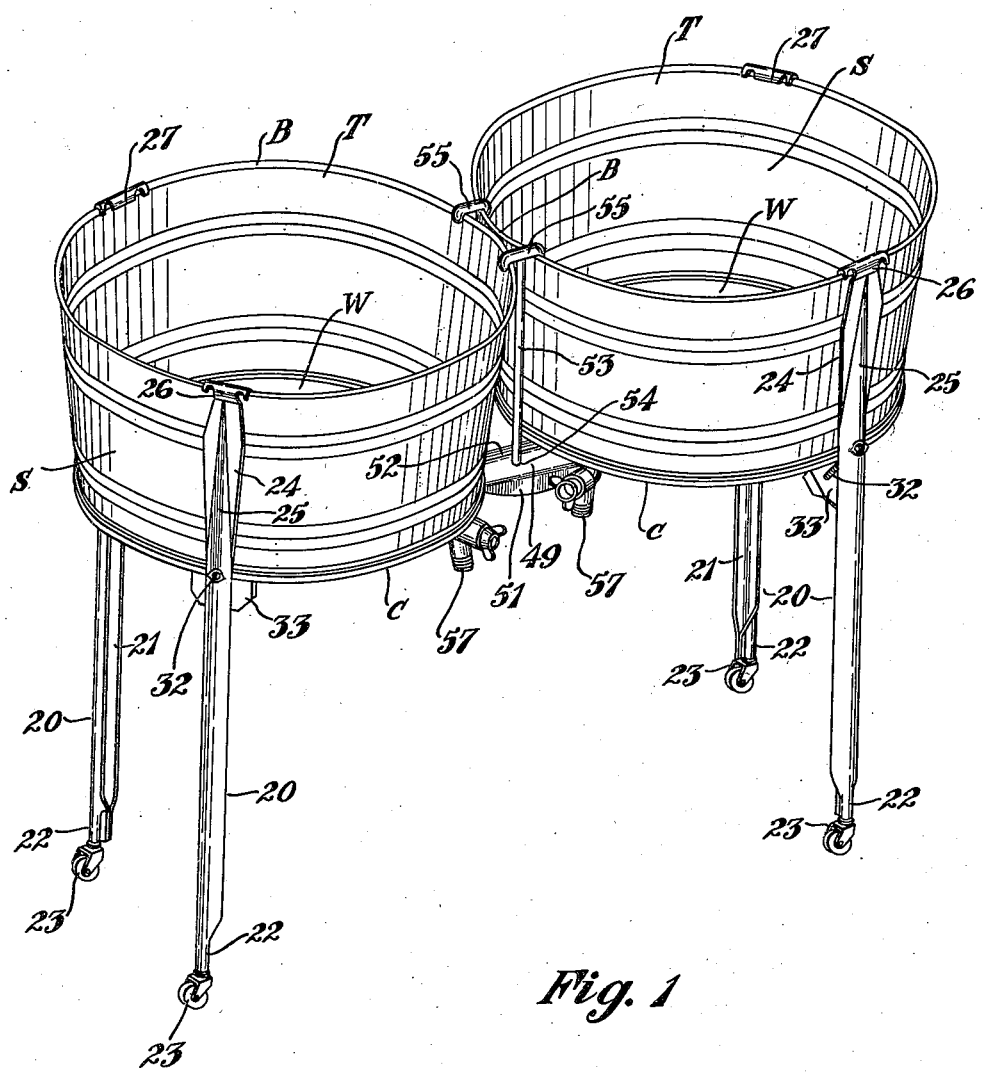

Dec. 9, 1941.   W. C. McCLASKEY   2,265,921
TUB SET
Original Filed Feb. 7, 1939   2 Sheets-Sheet 1

Inventor
William C. McClaskey
By Frease and Bishop
Attorneys

Dec. 9, 1941.　　　W. C. McCLASKEY　　　2,265,921
TUB SET
Original Filed Feb. 7, 1939　　2 Sheets-Sheet 2
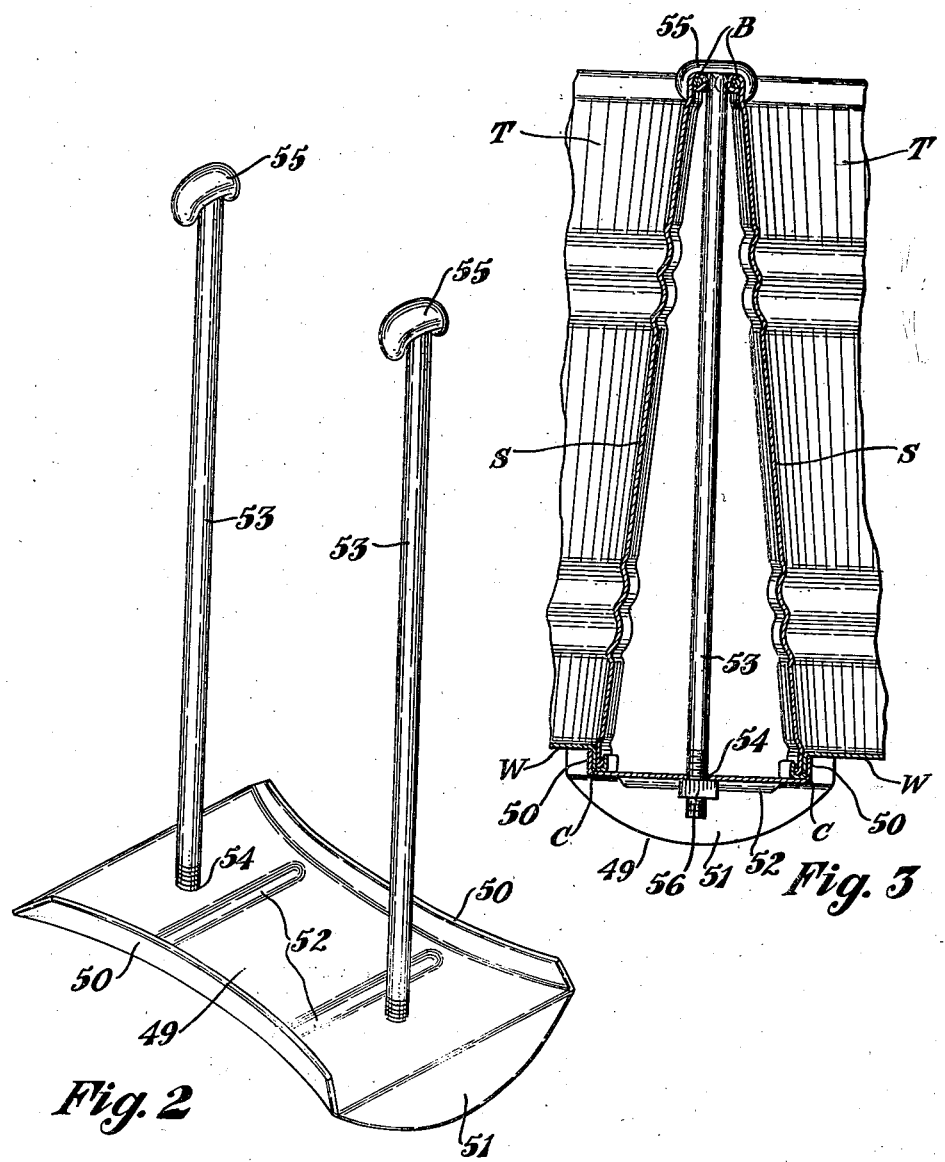
Inventor
William C. McClaskey
By Fraser and Bishop
Attorneys Patented Dec. 9, 1941

2,265,921

UNITED STATES PATENT OFFICE 2,265,921

TUB SET

William C. McClaskey, New Philadelphia, Ohio, assignor to Reeves Steel and Manufacturing Company, Dover, Ohio, a corporation of Ohio Original application February 7, 1939, Serial No. 255,107, now Patent No. 2,223,075, dated November 26, 1940. Divided and this application June 7, 1940, Serial No. 339,306

4 Claims. (Cl. 248—151)

The invention relates to a tub set or standard for supporting two or more tubs connected together as a unit and this application is a division of my co-pending application, Serial No. 255,107, filed February 7, 1939 which has matured into Patent No. 2,223,075, November 26, 1940.

The object of the improvement is to provide a standard for supporting two or more tubs, and comprises a plurality of legs and co-operating clips for supporting the tubs spaced above the floor and means for attaching two adjoining tubs together.

Another object is the provision of a novel form of clip for attaching the two tubs together at their chimes and provided with vertically disposed bolts having double hooked heads which engage over the rim beads of the two tubs.

The above objects together with others which will be apparent from the drawings and following description or which may be later referred to may be attained by constructing the invention in the manner illustrated in the accompanying drawings, in which Figure 1 is a perspective view showing two tubs connected together by the improved clip and bolts and supported spaced above the floor by means of the improved legs and clips;

Fig. 2, a perspective view of the improved clip for attaching the two adjoining tubs together at their chime portions and provided with the bolts having double hooked heads for attaching the tubs together at their rim portions; and Fig. 3, a fragmentary sectional view of adjoining portions of two tubs attached together with the improved clip and bolts.

Similar numerals refer to similar parts throughout the several views.

The invention contemplates the provision of a standard or support for two or more connected tubs and consists generally of legs and clips arranged to be detachably connected thereto and so constructed that when attached together they will support the tubs spaced above the floor, a clip with clamping bolts being provided for connecting two adjoining tubs together and supporting them at the point of connection whereby it is not necessary to provide supporting legs at this point.

The improved leg and clip have been disclosed in detail and are claimed in my co-pending application Serial No. 255,107 above referred to and for this reason it is not thought necessary to illustrate and describe these parts in detail in the present application.

Two tubs indicated at T may be of any usual and wellknown form of sheet metal tubs including the side walls S, bottom walls W, rim beads B and chimes C.

The legs which support the tubs above the floor are indicated generally at 20 and may be formed of fairly heavy gauge sheet metal preferably of cross-sectional shape throughout the greater part of their length as indicated at 21, the lower end of each leg being preferably of tubular shape as shown at 22 for the attachment of a caster indicated at 23.

The upper portion of each leg may be substantially flat as indicated at 24 provided with the upwardly tapered central corrugation or rib 25 which is a continuation of the channel portion 21.

The upper end of each leg may be bent outward at an angle as shown at 26 to accommodate the rim bead B of the tub, and is then hooked forwardly and downwardly as at 27 so as to engage over the rim bead.

The clips, by means of which the legs are attached to the tubs, may be formed of a fairly heavy gauge sheet metal and are indicated generally at 33 being engaged under the chimes of the tubs as disclosed in detail in my co-pending application above referred to and clipped to the legs as by the bolts 32 in the manner described in said co-pending application.

As shown in Figure 1 a spaced pair of these legs is preferably attached to each tub at points considerably spaced from the point of connection of the two tubs.

The two tubs are tied together by means of the improved attaching device which comprises the attaching clip 49 formed of heavy gauge sheet metal and having the arcuate upstanding flanges 50 at its side edges for engagement beneath the chimes C of the tubs, downturned strengthening flanges 51 being preferably formed at the ends of the clip and transversely disposed strengthening corrugations 52 being formed through the central portion of the clip.

A pair of vertically disposed bolts 53 are located through openings 54 near opposite ends of the clip 49 and are provided at their upper ends with the double hooked heads 55 which engage over the rim beads of the two tubs in the manner shown in Figs. 1 and 3.

When the nuts 56, upon the lower threaded ends of these bolts, are tightened the two tubs are tightly clamped together between the hooked heads 55 of the bolts and the arcuate flanges 50 of the clip.

Although only two tubs are shown connected together by the clips and bolts and supported upon the legs to which the invention pertains, it should be understood that any number of tubs may be connected together and supported in this manner. The tubs may be provided with drain cocks 57 by means of which the contents may be drained therefrom in usual manner, but such drain cocks, of course, form no part of the present invention.

I claim:

1. A support for two adjacent tubs including legs attached to the remote sides of the tubs, a clip having flanges at opposite sides engaging the adjacent chime portions of the tubs, and double hooks connected to said clip and engaging over the adjacent rim beads of the tubs.

2. A support for two adjacent tubs including legs attached to the remote sides of the tubs, a clip having flanges at opposite sides engaging the adjacent chime portions of the tubs, and bolts connected to said clip and having double hooks at their upper ends engaging over the adjacent rim beads of the tubs.

3. A support for two adjacent tubs including legs attached to the remote sides of the tubs, a heavy sheet metal clip having arcuate, upstanding flanges at its side edges conforming to and fitting within the adjacent chime portions of the tubs, and having straight ends with depending flanges, bolts connected to the clip and extending upward between the tubs, double hooks at the upper ends of the bolts engaging over the adjacent rim beads of the tubs, and means for drawing the double hooks toward the clip to clamp the tubs therebetween.

4. A support for two adjacent tubs including legs attached to the remote sides of the tubs, a heavy sheet metal clip having arcuate, upstanding flanges at its side edges conforming to and fitting within the adjacent chime portions of the tubs, and having straight ends with depending flanges and transverse corrugations in said clip, bolts connected to the clip and extending upward between the tubs, double hooks at the upper ends of the bolts engaging over the adjacent rim beads of the tubs, and means for drawing the double hooks toward the clip to clamp the tubs therebetween.

WILLIAM C. McCLASKEY.